A. L. MARPLE.
FLYING MACHINE.
APPLICATION FILED MAR. 8, 1921.
1,408,899.
Patented Mar. 7, 1922.
3 SHEETS—SHEET 1.
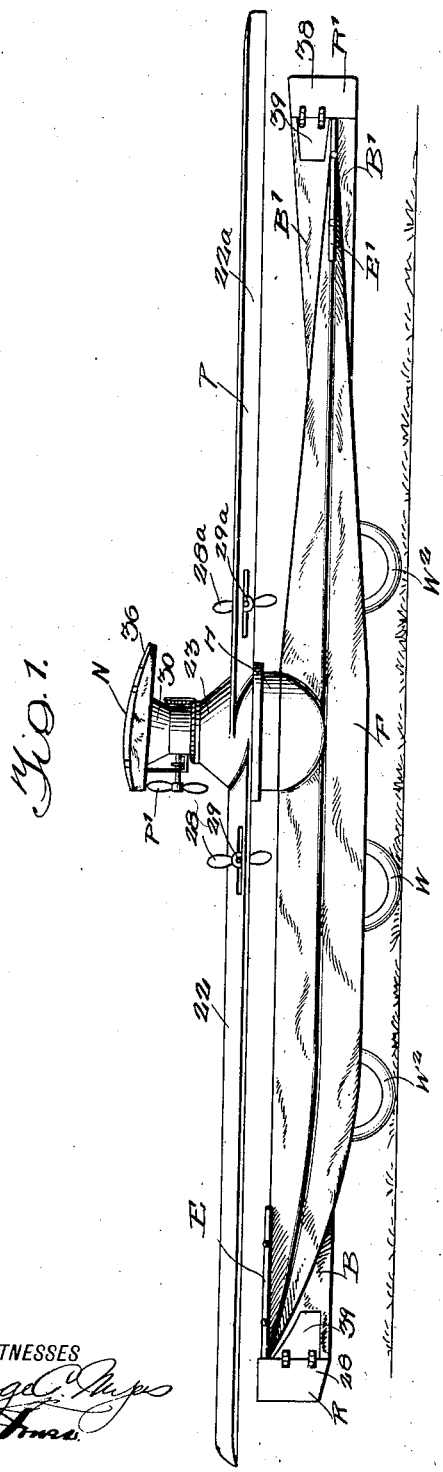
WITNESSES
INVENTOR
A. L. MARPLE,
BY
ATTORNEYS

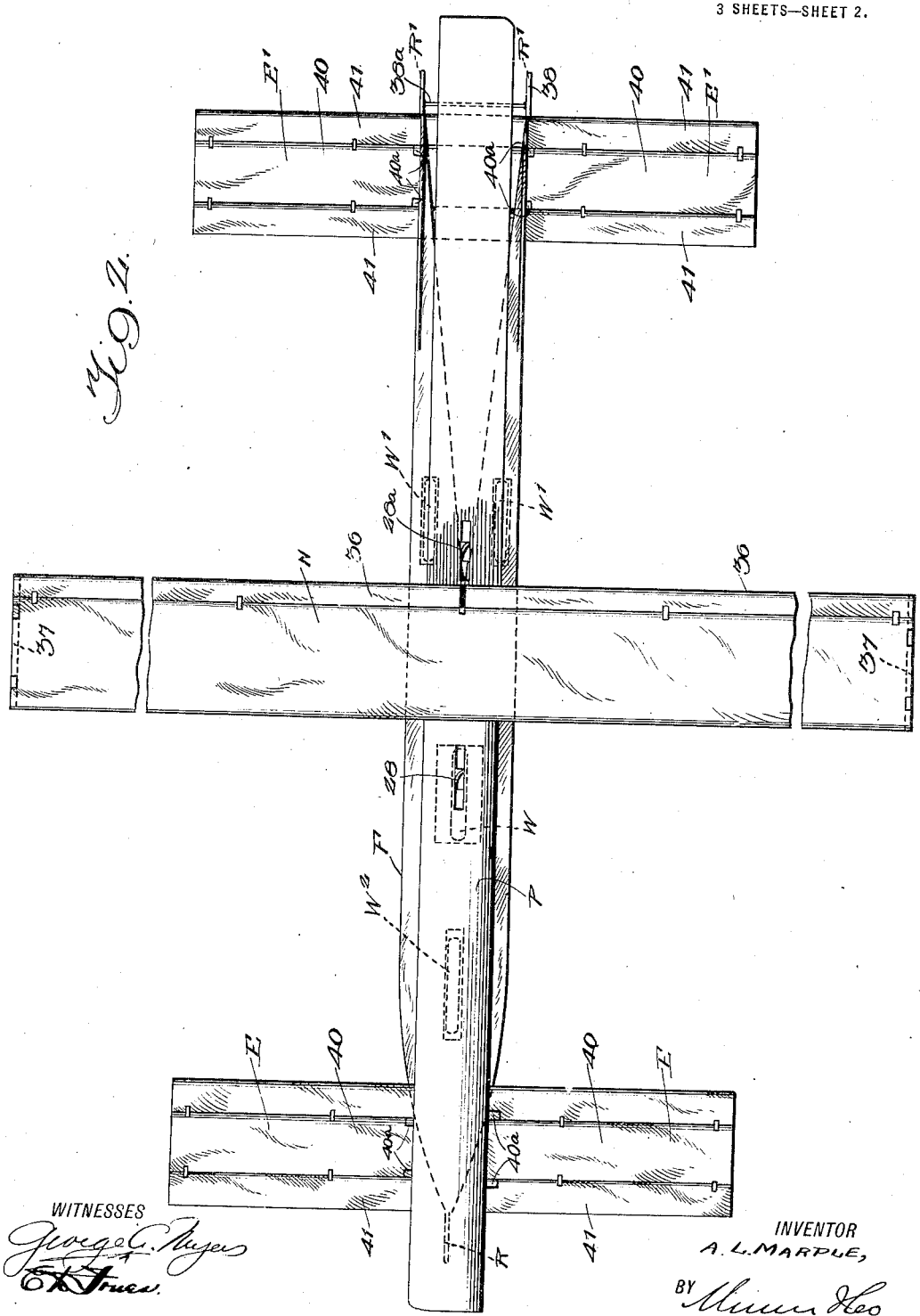

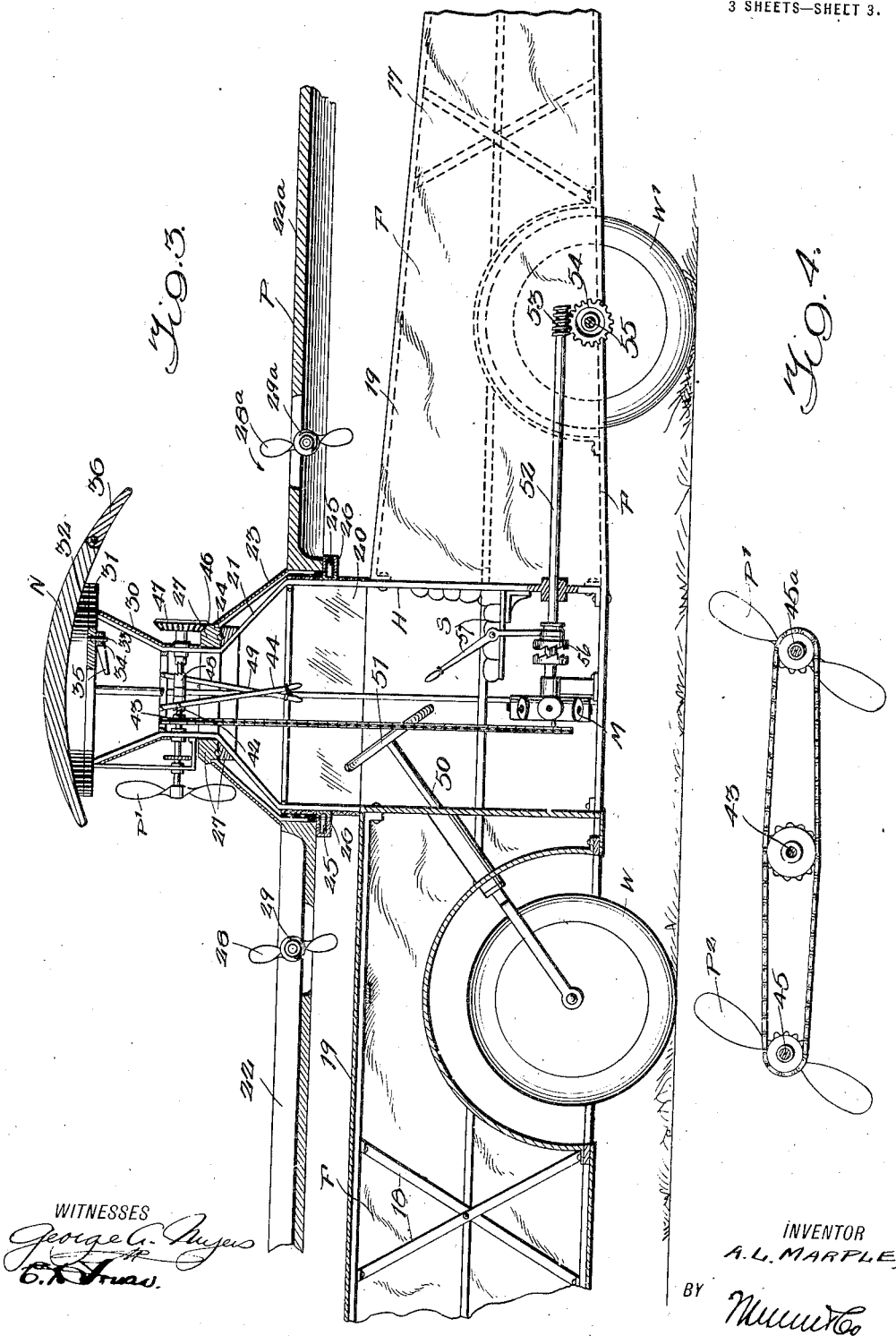

UNITED STATES PATENT OFFICE.

ARTHUR LANZSY MARPLE, OF CUMBERLAND, MARYLAND.

FLYING MACHINE.

1,408,899.   Specification of Letters Patent.   Patented Mar. 7, 1922.

Application filed March 8, 1921. Serial No. 450,550.

*To all whom it may concern:*

Be it known that I, ARTHUR LANZSY MARPLE, a citizen of the United States, and a resident of Cumberland, in the county of Allegany and State of Maryland, have invented certain new and useful Improvements in Flying Machines, of which the following is a specification.

My invention relates generally to vehicles, and a purpose of my invention is the provision of a vehicle which is adaptable for use as a land, water and air vehicle, my invention being particularly designed as a land and air vehicle for use as a public conveyance for the carrying of passengers through the streets of a city as a land vehicle, and to distant points through the air as an air vehicle. The construction of the vehicle is such as to permit of its being partially folded when traversing the streets and when in storage, and when traversing the air it is adapted to be extended to its full capacity so as to properly function for use as an air plane. Its construction also allows of the safe landing and departing from the water without undue strain or stress, and at the same time permits of its safe travelling through the water as a hydroplane.

It is also a purpose of my invention to provide a flying machine of the combined aeroplane and helicopter type, the helicopter propeller being associated with the machine in a manner to secure a gyroscopic action so as to render the machine inherently stable while at the same time providing the necessary lifting action.

I will describe one form of vehicle embodying my invention and will then point out the novel features thereof in claims.

In the accompanying drawings:

Figure 1 is a view showing in side elevation one form of vehicle embodying my invention.

Figure 2 is a top plan view of Figure 1.

Figure 3 is a fragmentary vertical longitudinal sectional view of the vehicle shown in the preceding views.

Figure 4 is a view somewhat diagrammatic and showing in front elevation the aeroplane propellers and their driving means.

Figure 5 is an enlarged detail perspective view of the fuselage of the vehicle.

Similar reference characters refer to similar parts in each of the several views.

Referring specifically to the drawings and particularly to Figure 1, my invention in its present embodiment consists of a fuselage F of novel form, and rudders R and R' at the leading and trailing ends thereof. Intermediate its ends, the fuselage F is formed with a housing H upon which is rotatably mounted a helicopter propeller P and above the propeller P is a main supporting plane N which, in conjunction with propellers P' and P², provides the necessary aerial propulsion for propelling the vehicle through the air. Elevating planes E and E' are supported and arranged at the leading and trailing ends of the fuselage which, in conjunction with the rudders R and R', are adapted to effect a control of the vertical movements of the vehicle through the air.

As illustrated to advantage in Figure 5, the fuselage F is of rectangular outline in cross section, and is supported in such position as to provide divergent bottom walls 15 and convergent top walls 16. The bottom walls 15 at the leading end of the fuselage are curved upwardly to the forward ends of the top walls 16 so as to provide a fuselage body having a pointed leading end disposed at the upper edge of the body. This form of leading end is particularly designed for securing an easy landing of the vehicle in water as will be hereinafter described, and it is to be particularly noted that such a construction also provides an efficient support for a motor should it be desired to position a motor at this point. The rear or trailing end of the fuselage F is bifurcated to provide divergent extensions 17 which are tapered toward their free ends and which form in effect a continuation of the general form of the fuselage body. These extensions serve to provide buoyancy forces in air as well as in water which prevent overturning of the fuselage due to the spacing apart of these forces. As shown in Figure 3, the fuselage F is constructed of a metallic framework 18 which is covered with sheeting 19 that is both water-proof and air-proof to provide an air-tight and consequently buoyant fuselage body.

The housing H is associated with the fuselage F in the manner shown in Figure 3, a suitable opening being formed in the upper side of the fuselage for the accommodation of the housing, and the front and rear walls of which are closed so as to maintain the fuselage air-tight. This housing H is adapted to accommodate the operator of the machine in addition to the motor for actuating the propelling means for the vehicle. As shown in Figure 3, S designates the operator's seat which is so positioned as to permit of the ready manipulation of the necessary levers for controlling the machine and for clearly observing the flight of the machine through a circular transparent panel 20 formed at the upper end of the housing. Above the panel 20, the housing H is provided with a super-structure 21 of conical form which rotatably supports the helicopter propeller P. As shown in Figures 1 and 3, the propeller P comprises reversely inclined blades 22 and 22$^a$ which are fixed at diametrically opposite points to a conical head 23 that is supported for rotation upon the superstructure 21 by means of roller bearings 24 and ball bearings 25. The roller bearings 24 are mounted for movement in a circular track 26 secured to the housing H, while the ball bearings 25 are mounted in race-ways 27 carried by the head 23 and the super-structure 21. The arrangement of the bearings 24 and 25 is such as to rotatably support the propeller P with the least possible friction and to maintain the hub and super-structure in proper relation to each other at all times. The propeller P is adapted to be rotated about the super-structure as an axis through the medium of rotary propellers 28 and 28$^a$ mounted directly on the blades 22 and 22$^a$, respectively, at points adjacent to the hub 23. The propellers 28 and 28$^a$ are actuated by motors 29 and 29$^a$ of standard form mounted directly on the blades 22 and 22$^a$ and operable to rotate the propellers in opposite directions as indicated by the arrows in Figure 3 so as to effect rotation of the propeller.

Supported by and arranged above the super-structure 21 is an inverted conical head 30 upon which is supported an annulus 31. The annulus 31 in turn supports an annulus 32 secured to a main plane N at a point intermediate its ends, the two annuli constituting a turn-table for rotatably supporting the plane N so that the latter can be moved from the transverse or active position as shown in the drawings to a longitudinal or inactive position. In the inactive position of the plane N, it is disposed longitudinally of the fuselage F. The annulus 32 of the turn-table is adapted to be locked against rotation upon the annulus 31 by means of a screw-threaded member 33 carried by the annulus 32 and extending into and through a circular slot formed in the annulus 31. The projecting end of the member 33 threadedly receives a nut 34 which, when rotated upwardly on the member 33 clampingly engages the annulus 31 and thereby locks the two annuli to each other. This nut 34 is manually operable by means of a handle 35 formed integral with the nut.

The main plane N is constructed substantially the same as the ordinary form of air plane, with the exception that its trailing edge carries hingedly mounted ailerons 36 which are adapted to be actuated by the operator occupying the seat S for partially controlling the vertical movement of the vehicle. In order to simplify the description and drawings, I have not in the present instance shown any means for actuating these ailerons, but it is to be understood that any suitable means may be provided. This is also true in connection with other ailerons provided on the elevating planes E and E', as well as the rudders R and R'. The opposite ends of the plane N are also provided with end ailerons 37 which are primarily designed for controlling the horizontal movement of the vehicle, but which also serve as non-skid fins to prevent longitudinal skidding of the plane. These ailerons 37 are operable from the seat S by any suitable form of mechanism.

The rudders R and R' located at the opposite ends of the fuselage F are supported on head and tail fins B and B' and are each composed of a main blade 38 and a subsidiary blade 39 secured to each other and mounted for swinging movement about a vertical axis. The main blades 38 are relatively large and are designed to effect the horizontal steering of the vehicle, while the subsidiary blades 39 serve to counter-balance the main blades and to thus insure the easy operation of the rudders. As shown in Figure 2, the rear rudder R' is composed of two pairs of blades 38 and 39, with the blades 38 rigidly connected to each other by a rod 38$^a$. The fins B and B' are arranged vertically on the fuselage F and along its longitudinal axis, and tapered in form from their secured ends to their free ends, as shown in Figure 1.

The elevating planes E and E' are each comprised of a normally stationary section 40 arranged transversly of the fuselage F and hingedly supported thereon as indicated at 40$^a$, and movable planes 41 at the forward and rear longitudinal edges of the stationary plane. The sections 40 normally occupy extended positions as shown in Figure 2 but by means of their hinged connection can be moved to occupy vertical positions for a purpose to be hereinafter described. The movable sections 41 of one elevating plane cooperate with the movable sections of the other elevating plane to effect, in conjunction with the ailerons 36 and 38, control of the vertical movements of the vehicle, it being understood that the stationary sections 40 coact with the main plane N to provide the necessary supporting means as the vehicle travels forwardly through the air. The stationary sections 40 also provide additional stabilizing means and serve to prevent accidental overturning of the vehicle when travelling through the air or water.

As illustrated to advantage in Figure 3, the motor M is located within the housing H for the propulsion of the aeroplane propellers P' and P². The propellers are arranged below the leading edge of the main plane N and are operated by the motor M through the medium of the following mechanism:—A driving shaft 42 is journaled within the housing H between super-structure 21 and hub 30, and this shaft is operatively connected to the motor M through a chain and sprocket connection as shown in Figure 3. A clutch 43 connects or disconnects the sprocket and chain connection to or from the shaft 42, such clutch being operated by a lever 44. The shaft 43 is operatively connected to shafts 45 and 45ª by means of sprocket and chain connections as clearly shown in Figure 4 so as to rotate the propellers P' and P² in the same direction.

The motor M also serves to assist in the propulsion of the helicopter propeller P and provides an auxiliary means of propulsion in the event that the motors 29 and 29ª fail in rotating the propellers 28 and 28ª. The motor M is operatively connected to the propeller P by means of a ring bevel gear 46 formed on the upper race-way 27 of the hub 23. This gear 46 meshes with the bevel gear 47 and is loosely mounted on the shaft 42. The gear 47 is adapted to be fixed to the shaft 42 by a clutch 48 operated by a lever 49.

From the foregoing arrangement it will be clear that the clutches 43 and 49 provide means for the arbitrary propulsion of the propellers P, P', and P², this control being necessary in order to effect the proper manipulation of the vehicle.

As shown in Figures 1 and 3, the fuselage F is adapted to be supported by rubber tired wheels which are partially housed by the fuselage to offer the least possible resistance to cross currents of air. The fuselage body is recessed in the manner shown in Figure 3, to accommodate these wheels, it being understood that the recessed portions of the body are formed in such a manner as to maintain the air-tight state of the body. In the present instance I have provided a steering wheel W arranged slightly in advance of the housing H and which is mounted for bodily movement upon the forked end of a steering shaft 50. The shaft 50 is journaled into the fuselage F and extends into the housing H where it is provided with a wheel 51 disposed in convenient relation to an operator occupying the seat S. Two driving wheels W' are also provided at the rear of the housing H, such wheels being driven by the motor M through the medium of a shaft 52 provided with a worm 53 meshing with a worm gear 54 fixed to a shaft 55 upon which latter the wheels are mounted. The shaft 52 is adapted to be operatively connected to the motor shaft by means of a clutch 56 operated by a lever 57 arranged adjacent the seat S. A fourth wheel W² is provided in advance of the steering wheel W. This wheel W² is adapted to work in conjunction with the steering wheel in supporting the forward end of the fuselage when the latter is tipped forwardly such as when the vehicle is landing. The arrangement of the several wheels W, W' and W² is such that in the normal position of the fuselage, the wheels W and W' serve to support the vehicle for movement over the ground when the vehicle is starting on an air flight or when it is functioning as a land vehicle. It is to be particularly noted that the steering wheel W operates as the fulcrum point of the fuselage so that the vehicle when travelling over uneven ground will rock about the wheel W as a center with the wheels W' and W² alternately contacting with the ground and thus preventing endwise tipping of the vehicle.

By reference to Figure 1, it will be seen that the vertical axis of the housing H constitutes the center of gravity of the entire vehicle and that the main plane N intersects the vehicle at this point. The axis of rotation of the helicopter propeller P is about the axis of the housing H, and it is by means of this arrangement that a flying machine is produced having great stability.

In the operation of the vehicle as an air vehicle, the rotation of the propeller P effects a rapid vertical lifting of the vehicle, it being noted that the combined lengths of the blades 22 and 22ª exceeds that of the fuselage, and it is because of this relatively large area of the propeller that sufficient lifting action is secured to elevate the vehicle to any desired height and to maintain the vehicle substantially stationary in the air by properly controlling the rotational speed of the propeller. The forward travel of the vehicle through the air is of course produced by the propellers P' and P² which in conjunction with the main plane N serves to maintain the vehicle in suspension in the same manner as the standard form of air plane. The elevating planes being disposed upon opposite sides of the center of gravity of the vehicle naturally serve to stabilize the vehicle when travelling through the air, and produce an equal lifting action on the leading and trailing edges of the main plane N. This arrangement renders nose and tail diving of the vehicle almost impossible, while the fins or ailerons 37 serve to prevent lateral skidding of the main plane. The ailerons 37 when occupying vertical positions trap that air which normally leaks around the end wing of the main plane and in so doing prevents longitudinal movement of the plane, while at the same time causing the currents of air to pass directly beneath the plane which naturally increases the lifting efficiency of the plane.

The rudders R and R' in addition to controlling lateral movements of the vehicle through the air also co-operate with the end ailerons 37 in preventing lateral skidding of the vehicle.

The fuselage F is of such form as to present a truly stream-line body with naturally decreases resistance and prevents the usual vacuum forming in the rear of the fuselage. When the vehicle functions as a water vehicle, the fuselage is of special importance in that its leading end is so shaped that when impinging upon the surface of the water the divergent bottom walls 15 effect a gradual spreading of the water outwardly and downwardly which naturally minimizes the shock of the impact and thus prevents destruction of the machine. When traversing the water, the bottom walls 15 of the fuselage co-operate with the water by imparting a lifting action to the fuselage until the fuselage is substantially supported on its lower edge. It is to be particularly noted that the divergent side walls of the fuselage also serve to prevent the formation of a vacuum as the fuselage strikes the water. This absence of vacuum is a result of the continuous stream-line of the bottom walls which, because of the upwardly curved leading end effects a gradual opening of the water at the same time excluding all air from between the fuselage and the water. This is of especial advantage when the vehicle is leaving the water for flight as in sea-planes of the ordinary construction. The fuselage is such as to create a vacuum therebeneath which, when the plane is leaving the water throws the machine out of its path of flight when the vacuum is broken and thus tends to overturn the machine. When travelling over the water, the extensions 17 stabilize the fuselage and prevent any axial turning of the same, while at the same time preventing the formation of a vacuum at the rear end of the fuselage by virtue of their tapered formation. This formation also serves to reduce the friction which permits of the passage of the fuselage through the air and water with the least possible resistance.

When the vehicle functions as a land vehicle, it is obvious that the propellers P, P' and P² and 28 and 28ᵃ are at rest, the propeller P' and the plane N occupying positions parallel with respect to the fuselage F, while the elevating planes E and E' are folded to occupy vertical positions. With the vehicle folded in this manner, it will be clear that it occupies a minimum amount of space so that it can readily traverse the streets of a city, and can be readily stored in relatively narrow hangars.

What I claim is:

1. A vehicle comprising, a fuselage, wheels supporting the fuselage and partially housed therein, a helicopter propeller arranged above the fuselage, a main supporting plane above the helicopter propeller and arranged transversely of the fuselage, elevating planes at the opposite ends of the fuselage, rudders at the opposite ends of the fuselage, aeroplane propellers beneath and adjacent the main supporting plane, and means for driving the propellers and certain of said wheels.

2. A vehicle comprising, a fuselage, a helicopter propeller sustained above the fuselage, a main plane arranged transversely of the fuselage and disposed above the helicopter propeller, ailerons on the trailing edge of the main plane, elevating planes at the opposite ends of the fuselage and arranged transversely of the same, each of said elevating planes comprising a stationary section and movable sections hingedly supported on the leading and trailing edges of the stationary section, rudders at the opposite ends of the fuselage, aeroplane propellers adjacent and beneath the main plane, and means for actuating all of the propellers.

3. A vehicle comprising, a fuselage, a housing formed intermediate the ends of the fuselage, a helicopter propeller rotatably supported on the housing, a main plane supported directly above the housing and arranged transversely of the fuselage, aeroplane propellers beneath and adjacent the main plane, propellers mounted on the blades of the helicopter propeller for effecting rotation of the latter, elevating planes at the opposite ends of the fuselage, rudders at the opposite ends of the fuselage, and means for actuating all of the propellers.

4. A vehicle comprising, a fuselage, a housing arranged intermediate the ends of the fuselage, a helicopter propeller rotatably mounted on the housing and having blades the combined length of which exceed the length of the fuselage, rotary propellers mounted in each of the blades, means for actuating the propellers to effect rotation of the helicopter propeller, a main plane supported on the housing and arranged above helicopter propeller, aeroplane propellers adjacent and beneath the main plane, elevating planes at the opposite ends of the fuselage, and a rudder.

5. A vehicle comprising, a fuselage, traction means for propelling the fuselage over the ground, and steering the same, a helicopter propeller arranged above the fuselage, a main plane above the helicopter propeller, aeroplane propellers adjacent the main plane, elevating planes at the opposite ends of the fuselage, and rudders at the opposite ends of the fuselage.

6. A vehicle comprising, a fuselage, a housing supported on the fuselage at such a point as to constitute the center of gravity of the vehicle, traction wheels beneath, in advance and at the rear of said housing for supporting the fuselage for movement over the ground, a helicopter propeller rotatably supported on the housing, a main plane above the helicopter propeller and arranged transversely of the fuselage, elevating planes at the opposite ends of the fuselage, and rudders at the opposite ends of the fuselage.

7. A vehicle comprising, a fuselage comprising an air-tight body of angular cross sectional contour with a pointed leading end and a bifurcated trailing end, a housing arranged intermediate the ends of the fuselage and constituting the center of gravity of the vehicle, traction wheels partially housed by the fuselage and arranged beneath, in the rear and in advance of the housing, means for steering and driving certain of the wheels, a helicopter propeller supported for rotation about the housing as an axis, a main plane above the helicopter propeller and supported by said housing, elevating planes at the opposite ends of the fuselage, and rudders on the fuselage.

8. In a flying machine, a fuselage, a main plane supported medially of the ends of the fuselage and arranged transversely of the same, ailerons on the trailing edge of the main plane, elevating planes at the opposite ends of the fuselage and comprising stationary sections and movable sections at the leading and trailing edges of the stationary sections, and rudders at the opposite ends of the fuselage.

9. In a flying machine, a fuselage, a main plane supported on and medially of the ends of the fuselage, ailerons carried by the trailing edge of the main plane, depending movable ailerons carried by the end edges of the main plane, propellers beneath and adjacent the main plane, elevating planes at the opposite ends of the fuselage comprising stationary sections and movable sections, and rudders at the opposite ends of the fuselage.

10. A vehicle comprising, a fuselage, wheels for supporting the fuselage partly housed by the latter, a housing on the fuselage intermediate its ends and constituting the center of gravity of the vehicle, a helicopter propeller rotatably mounted on the housing, a main plane normally occupying a transverse position with respect to the fuselage but adapted to be moved to a position parallel with respect to the fuselage, elevating planes at the opposite ends of the fuselage normally occupying horizontal and transverse positions with respect to the fuselage and capable of being folded to occupy vertical positions, and rudders at the opposite ends of the fuselage.

11. In a flying machine, a fuselage, a helicopter propeller on the fuselage, a main plane supported above the propeller and movable to occupy transverse and parallel positions with respect to the fuselage, means for locking the main plane in either of its positions, propellers disposed beneath and adjacent the main plane, means for rotating the helicopter propeller, foldable elevating planes at the opposite ends of the fuselage, and rudders on the fuselage.

12. A water and air vehicle comprising, an air-tight fuselage having divergent bottom walls, an upwardly curved leading end and a bifurcated trailing end, a housing on the fuselage and constituting the center of gravity of the vehicle, a helicopter propeller mounted for rotation about the housing as an axis, a main plane supported on the housing, ailerons on the trailing edge of the main plane, elevating planes at the opposite edge of the fuselage, and including movable and stationary sections, propellers adjacent and beneath the main plane, means for actuating the propellers and the helicopter propeller, and rudders at the opposite ends of the fuselage.

ARTHUR LANZSY MARPLE.